US006914247B2

United States Patent
Duggan et al.

(10) Patent No.: US 6,914,247 B2
(45) Date of Patent: *Jul. 5, 2005

(54) METHOD AND APPARATUS FOR DETECTING LENSES IN PACKAGE

(75) Inventors: Robert Duggan, County Kilkenny (IR); Ted Foos, Rochester, NY (US); Liam Power, Cork (IR); Paul A. Merritt, Herts (GB); Duncan Westland, Cambs (GB); Peter Morgan, Cambridge (GB)

(73) Assignee: Bausch & Lomb Incorporated, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/453,171

(22) Filed: Jun. 3, 2003

(65) Prior Publication Data

US 2003/0205672 A1 Nov. 6, 2003

Related U.S. Application Data

(63) Continuation of application No. 09/464,482, filed on Dec. 15, 1999, now Pat. No. 6,586,740.

(51) Int. Cl.$^7$ .................................................. G01J 5/02
(52) U.S. Cl. .................................... 250/341.8; 250/372
(58) Field of Search ............................. 250/341.8, 272, 250/339.01, 339.06, 461.1, 559, 372; 356/239.1, 239

(56) References Cited

U.S. PATENT DOCUMENTS

| 4,847,487 | A | 7/1989 | Bordini ................... 250/223 R |
| 5,049,216 | A | 9/1991 | Shead et al. .................... 156/64 |
| 5,500,732 | A | 3/1996 | Ebel et al. .................... 356/237 |
| 5,526,119 | A | 6/1996 | Blit et al. .................... 356/402 |
| 5,568,715 | A | 10/1996 | Ebei ............................... 53/54 |
| 5,633,504 | A | 5/1997 | Collins et al. ............ 250/461.1 |
| 5,640,464 | A | 6/1997 | Ebel et al. .................... 382/143 |
| 5,722,536 | A | 3/1998 | Pierce ......................... 206/5.1 |
| 5,943,436 | A | 8/1999 | Ebel ............................ 382/143 |
| 5,954,206 | A | 9/1999 | Mallon et al. ............... 209/580 |
| 5,970,983 | A | 10/1999 | Karni et al. .................. 128/898 |
| 5,995,213 | A | 11/1999 | Davis et al. ................. 356/124 |
| 6,072,172 | A | 6/2000 | Duggan et al. ............. 250/221 |
| 6,124,594 | A | 9/2000 | Duggan et al. .......... 250/341.8 |
| 6,246,062 | B1 | 6/2001 | Ross, III et al. ......... 250/461.1 |
| 6,586,740 | B1 * | 7/2003 | Duggan et al. .......... 250/341.8 |

FOREIGN PATENT DOCUMENTS

| EP | 0 070 252 A1 | 7/1981 | ............ B65B/57/00 |
| EP | 0 691 273 A1 | 5/1995 | ............ B65B/57/10 |
| EP | 0 686459 A2 | 6/1995 | ............ B23Q/3/08 |
| EP | 0 999 140 A1 | 5/2000 | ............ B65B/57/00 |
| WO | WO84/02398 | 6/1984 | ............ G01N/21/88 |
| WO | WO 95/04264 | 2/1995 | ............ G01M/11/02 |

* cited by examiner

*Primary Examiner*—Hung Xuan Dang
(74) *Attorney, Agent, or Firm*—John E. Thomas

(57) ABSTRACT

A method and apparatus for detecting under- or over-filling of lenses in packages where ultraviolet radiation is directed to the package.

11 Claims, 4 Drawing Sheets

METHOD AND APPARATUS FOR DETECTING LENSES IN PACKAGE

This is a continuing application of Ser. No. 09/464,482, filed Dec. 15, 1999, now U.S. Pat. No. 6,586,740.

BACKGROUND OF THE INVENTION

A conventional method of packaging ophthalmic lenses, such as contact lenses, is in so-called blister packages. Such packages include a recess designed to hold an individual lens, usually in a saline solution in the case of soft hydrogel lenses. The blister packages are then enclosed and sealed with lidstock, the lidstock conventionally being a metallic laminate. In an automated process for packaging contact lenses, it sometimes occurs that a recess will be incorrectly filled, usually by two lenses or none, rather than the intended single lens. Each incorrectly filled package escaping detection can represent wasted capacity, material or labor, or lost customer goodwill.

SUMMARY OF THE INVENTION

The invention provides a method for confirming that an individual contact lens is present in a recess of a blister package, or determining if there is an excess or a deficiency in the number of lenses in the package. The method involves aligning a package with a source of ultraviolet radiation and a detector, and determining how much of the incident radiation is absorbed at the package. The amount of absorbed radiation is correlated to confirm that the lens is present, or to determine that the lens is missing, or to determine that an excess number of lenses are present. The invention further relates to an apparatus for carrying out the method.

DETAILED DESCRIPTION OF THE PREFERRED EMBODIMENT

Figure 1:
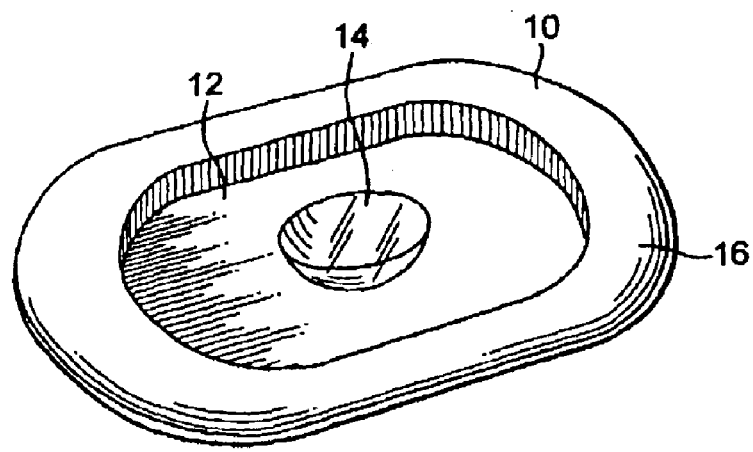
FIG. 1 is a perspective view of a lens blister package that includes a recess for holding a contact lens and packaging solution.

FIG. 1 illustrates a blister package for an ophthalmic lens such as a contact lens. In the illustrated embodiment, the package 10 includes a recess 12 for holding an individual contact lens 14. Recess 12 terminates at surface 16, and typically a metallic lidstock is sealed to surface 16 so as to sealingly encase recess 12 and enclose package 10. It is conventional for such packages to contain a packaging solution, such as saline solution, that is sealed in recess 12 along with the lens 14.

An occasional problem in manufacturing contact lenses is that a lens may be missing from the blister package 10, or that two lenses—"twins"—may be dispensed into the recess 12 in error. The absence of a lens or the occurrence of twins is more likely to go unnoticed in an automated or semi-automated system where an operator is not manually placing a lens in each package 10 immediately prior to the sealing operation.

Figure 2:
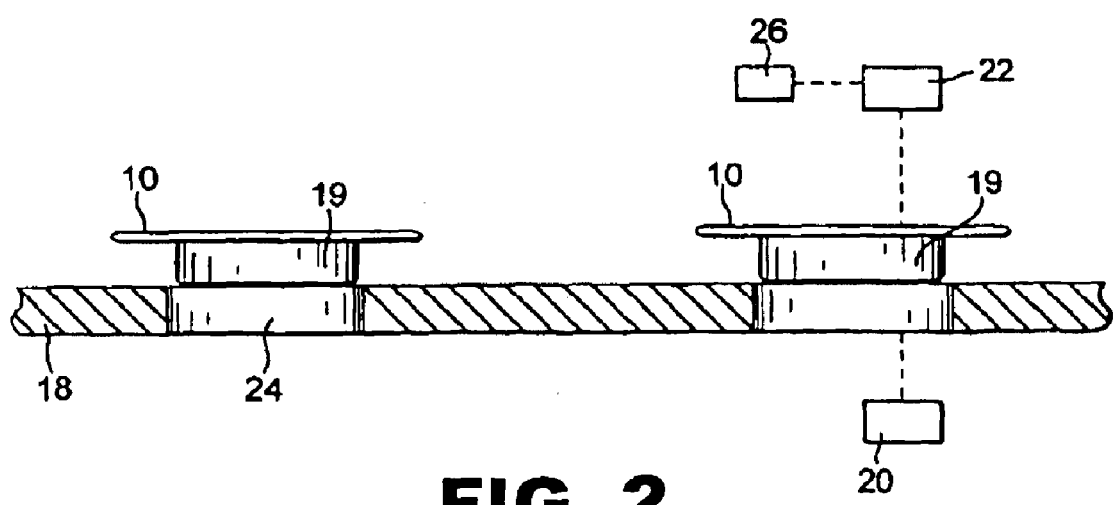
FIG. 2 is a side perspective view of the blister package and an apparatus according to an embodiment of the invention.

FIG. 2 shows schematically an apparatus for detecting an excess or deficiency of lenses in the package 10. The apparatus includes a stepped conveyor 18 for transporting packages 10, and positioned along the conveyor 18 are at least one ultraviolet radiation source 20 and a corresponding ultraviolet detector 22. The conveyor has openings 24 smaller than a package but large enough to provide an unimpeded path for the ultraviolet radiation to pass through it. Detector 22 is connected to controller 26 programmed in a manner that if the detector 22 does not render a reading within a prescribed range, i.e., corresponding to the presence of one and only one lens 14 in the package 10, corrective action can be taken. For example, an alarm can be sounded to alert an operator, or the anomalous package can be removed automatically from the conveyor 18. In other words, the amount of radiation received at detector 22 is correlated to confirm that the desired single lens is present in the package, or to determine that the lens is missing, or to determine that an excess number of lenses is present.

In the embodiment illustrated in FIG. 2, the UV radiation is directed through the package and any lens contained in the package, towards the UV detector 22. Accordingly, this system is useful for inspecting packages prior to sealing the package with metallic lidstock, as such lidstock would prevent transmission of the UV radiation to the UV detector.

Various modifications may be made to this system. For example, the detection system may be positioned to the side of conveyor 18, with a package being transferred from the conveyor to the detection system, and then returned to the conveyor after confirmation at the detection system that the desired single lens is contained in the package recess.

Figure 3:
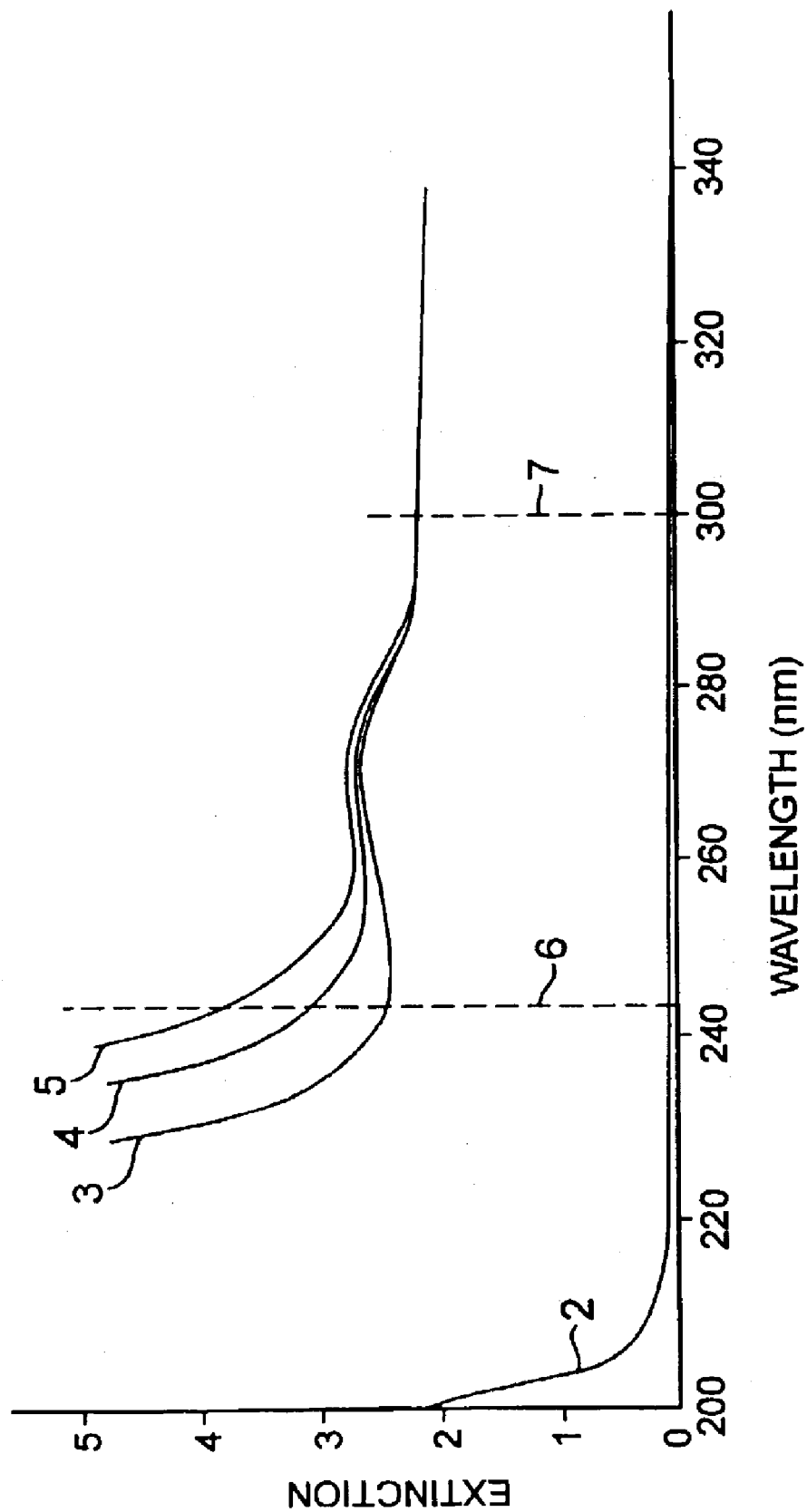
FIG. 3 is a schematic representation of the ultraviolet absorption characteristics of contact lens packages.

The principle of the method is best shown by referring to FIG. 3, which schematically shows ultraviolet absorption curves in the wavelength range 200–340 nm for various situations. The curves are plotted in terms of extinction versus wavelength, the extinction being the natural logarithm of the ratio of incident to transmitted radiation. Curve 2 is an extinction curve for a saline solution such of the type used in packaging contact lenses. Curve 3 is an extinction curve for the packaging material. Curve 4 represents the absorption of a package 10 with a single lens, and curve 5 the absorption of a package 10 with twin lenses. The saline solution only absorbs ultraviolet radiation at the shortest wavelengths of the range shown, and therefore, has no significant contribution to the extinction measurement. Curves 3, 4 and 5 all have similar features, namely a fairly flat region at the longer wavelengths, rising to a plateau at intermediate wavelengths, then a steep absorption edge at still shorter wavelengths. FIG. 3 shows that while curves 3, 4 and 5 effectively follow the same path at longer wavelengths, they increasingly diverge as they approach the absorption edge, and it is evident that the extinction values at an arbitrarily selected wavelength in the absorption region allow a clear differentiation between the presence of one lens in the blister package 10, and the presence of twins in the package, and the absence of any lens in the package.

The curves of FIG. 3 are idealized, that is, they do not take into account radiation which may be scattered by the packaging material. At the longer wavelengths, the extinction is effectively independent of the number of lenses present, and any difference, which actually occurs, can be taken as a measure of scattering losses. It should be understood that the absorption curves will shift depending on the amount of light scattered by the blister package.

In one embodiment of the invention, the detector 22 is a spectrophotometric detector. To normalize for the aforementioned scattering losses, a reference wavelength is chosen and used to provide an internal calibration of the measurement in the absorption edge region. Typically, a measurement wavelength of about 230 to 250 nm and a reference wavelength of at least about 290 nm may be used. A measurement wavelength of 243 nm is indicated by the dashed line 6 in FIG. 3, and a reference wavelength of 300 nm is indicated by the dashed line 7 in FIG. 3. At 243 nm, the extinction values for zero, one and two lenses in a package are 2.5, 3.2 and 3.9, respectively, which translate to a decrease in transmission by a factor of about two per lens. Features may be included in the detection system whereby an extinction value outside a specified range causes a response such as an alarm or an automatic diversion of an anomalous package from the conveyor 18.

Figure 4:
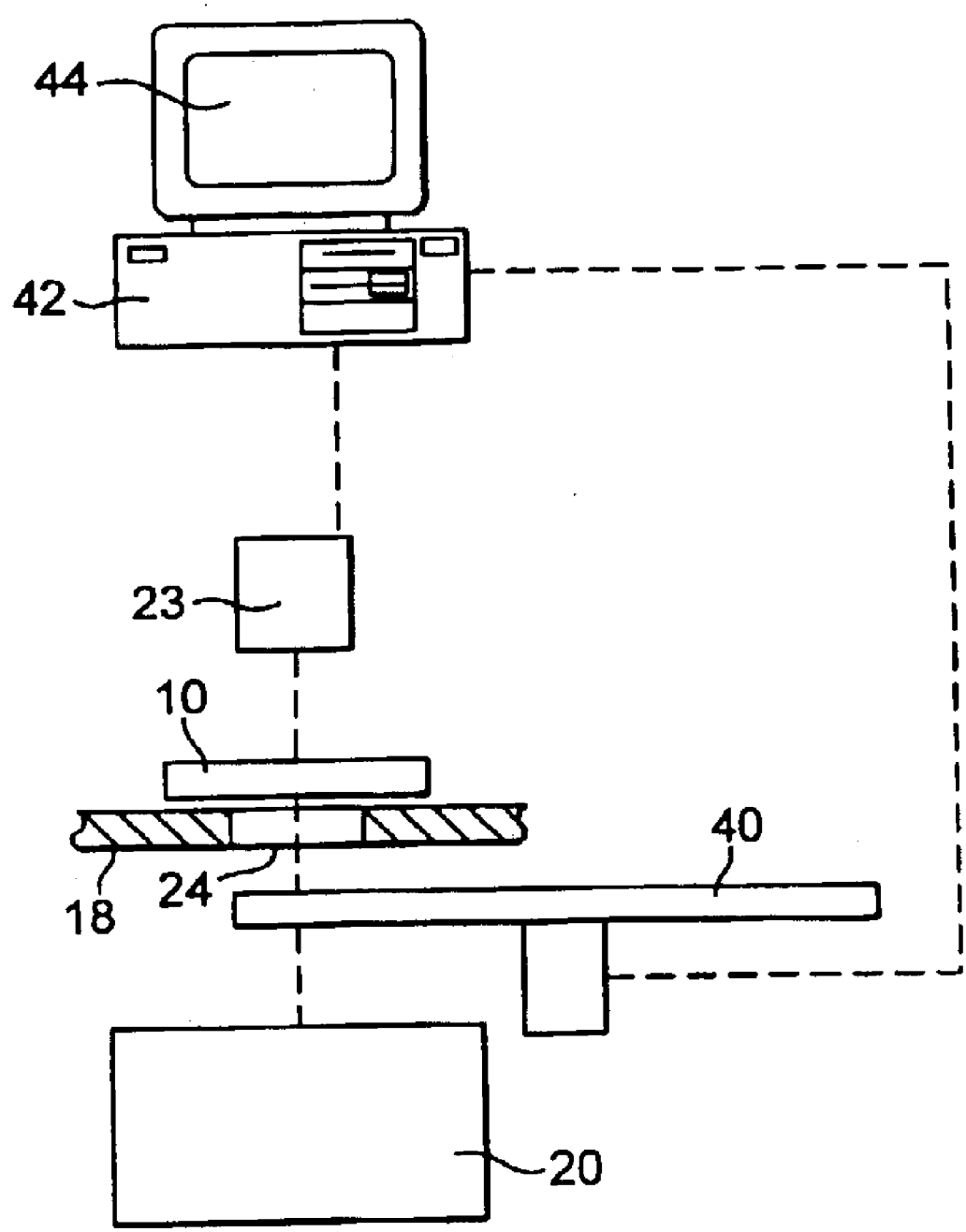
FIG. 4 is a schematic representation of a detection system including an ultraviolet camera.

Another embodiment of the invention is shown schematically in FIG. 4. In this embodiment, radiation from the ultraviolet source 20 is directed at a rotating filter wheel 40, which alternately allows radiation at a reference wavelength and a detection wavelength to pass to the package 10 and thence to the detector 22, which in this embodiment is an ultraviolet camera. Information from the camera is transmitted to a computer 42 which, being synchronized with the filter wheel 40, is able to process the reference and measurement data, and can cause an image to be displayed on a video monitor screen 44. The image thus obtained is substantially noise free, regardless of whether the lens 14 is positioned at the center of the package 10 (a highly scattering region) or at the edge of the package 10 (a region of low scatter). Although the image taken from a conveyor-borne package 10 is transitory, it may be captured and permanently recorded if necessary by the use of a frame-grabbing feature. The ability to observe and record an image is clearly advantageous not only for identifying under- or over-filled packages, but also for optionally performing inspection of the lens for defects, or for measuring dimensions of the lens.

Figure 5:
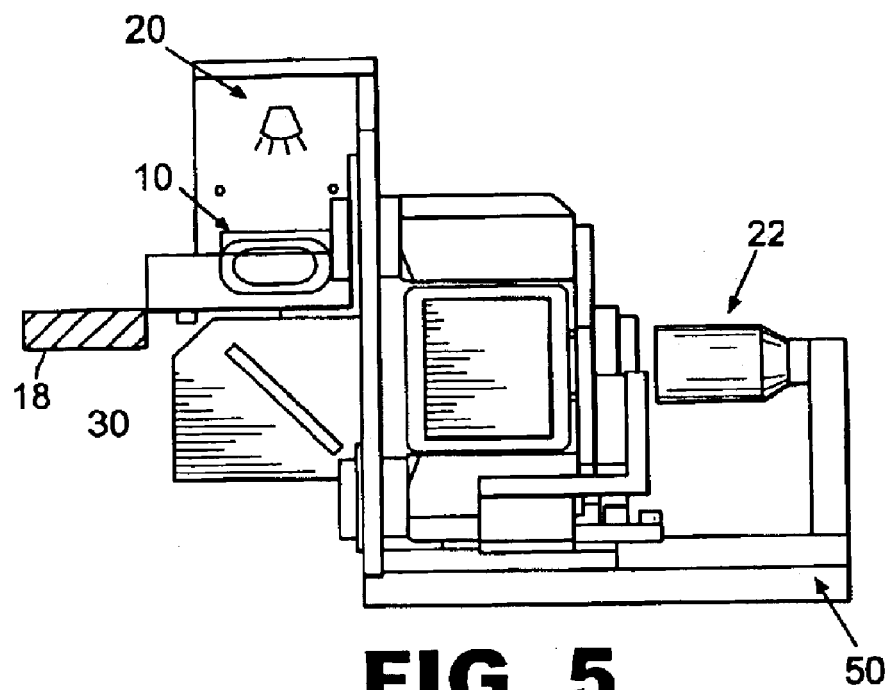
FIG. 5 is a side plan view of a detection system according to various preferred embodiments.
Figure 6:
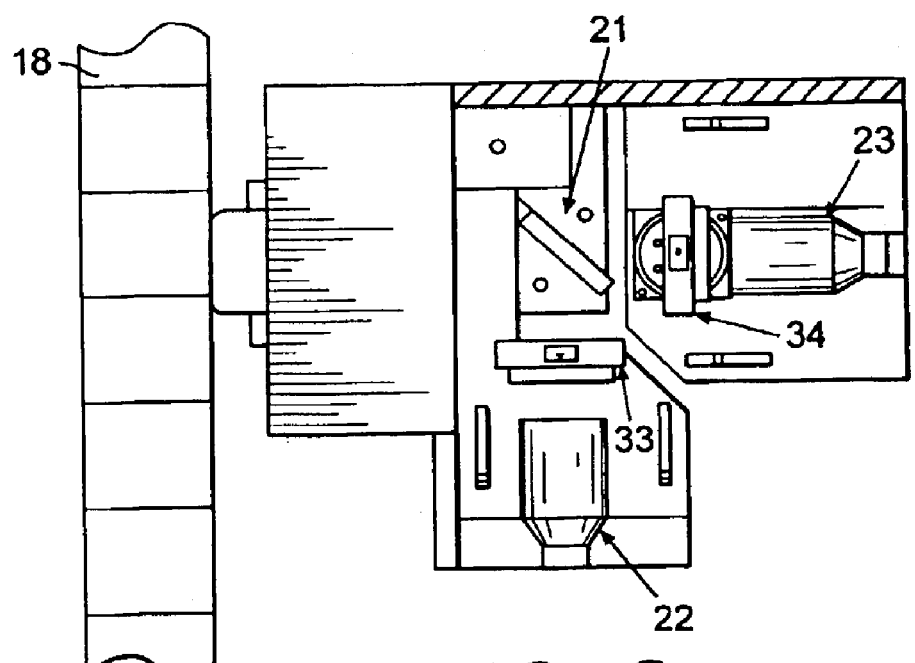
FIG. 6 is a top sectional view of the system of FIG. 5.

FIGS. 5 and 6 illustrate another embodiment employing a first UV detector 22 and a second UV detector 23 mounted on support 50. TV radiation is directed to package 10 from UV radiation source 20 having the form of a UV flash lamp. In this embodiment, as best seen in FIG. 5, package 10 is oriented on its side so that UV radiation is directed through the sides 17 of the recess 12 of the package, to mirror 30. From mirror 30, the radiation is reflected to beam splitter 31, which directs the radiation to first filter 33 and second filter 34 that are aligned with UV detectors 22 and 23, respectively. Thus, first filter 33 directs filtered UV radiation to UV detector 22 at a first, measurement wavelength, and second filter 34 directs filtered UV radiation to UV detector 23 at a second, reference wavelength. Preferably, the first filter 33 directs filtered radiation at a wavelength in the vicinity of dashed line 6 in FIG. 3, that is, at a wavelength where absorption curves 3, 4 and 5 diverge so as to allow a clear differentiation between the presence of one lens in the blister package (shown by curve 4), and the presence of twins in the package (shown by curve 5), and the absence of any lens in the package (shown by curve 3), for example, a wavelength between about 230 and 250 nm for the illustrated absorption curves. Preferably, second filter 34 directs filtered radiation at a wavelength where the absorption curves converge, for example, a reference wavelength of at least about 290 nm for the absorption curves illustrated in FIG. 3. Accordingly, UV detector 23 permits normalizing each individual blister package received at the apparatus to account for variations in opacity of the package, and thus, variations in light scattered by an individual package.

A particular advantage of the system shown in FIGS. 5 and 6 is that the package may be sealed with lidstock prior to evaluating the package to confirm the presence of a single lens in the package recess. To facilitate this arrangement, the package may be removed from conveyor 18 by a pick-and-place mechanism and orients the package in the orientation shown in FIG. 5.

The present invention offers various advantages over systems that rely on visible light to detect the presence of a lens in a package. For example, contact lens packages may be made of various grades of a plastic, including polyolefins such as polypropylene or polyethylene. Many such materials are not sufficiently transparent to visible light to permit obtaining a sufficiently clear image of the lens in the package, but are sufficiently transparent to ultraviolet radiation to permit transmission of UV radiation therethrough.

While we have described the invention in connection with preferred embodiments, we are aware that numerous and extensive departures may be made therein without however departing from the spirit of the invention and the scope of the appended claims.

What is claimed:

1. A method comprising aligning an ophthalmic lens package with an ultraviolet radiation detection system and confirming the presence or absence of a lens in the package, wherein the ultraviolet radiation detection system comprises a source of ultraviolet radiation directed through the package and an ultraviolet camera to receive at least a portion of the radiation transmitted from the package thereto.

2. The method of claim 1, further comprising recognizing an excess number of lenses in the package.

3. The method of claim 1, wherein the package comprises a recess for holding an individual contact lens.

4. The method of claim 1, wherein radiation received at the camera is correlated to confirm that a single lens is present in the package, or to determine that the lens is missing, or to determine that an excess number of lenses are present.

5. An apparatus comprising an ultraviolet detection system that recognizes the presence or absence of an ophthalmic lens in a package, wherein the ultraviolet detection system comprises an ultraviolet radiation source directed to the package and an ultraviolet camera to detect at least a portion of the radiation transmitted from the package thereto.

6. The apparatus of claim 5, wherein the detection system further recognizes an excess number of contact lenses in the package.

7. The apparatus of claim 5, wherein the package comprises a recess to hold an individual contact lens.

8. The apparatus of claim 5, further comprising a conveyor for transporting packages to the UV detection system.

9. A method of inspecting a lens comprising exposing the lens to ultraviolet radiation to obtain an image of the lens, and evaluating the image of the lens.

10. The method of claim 9, wherein the lens is a contact lens.

11. The method of claim 9, wherein the lens is exposed to ultraviolet radiation while retained in a recess of a package.

* * * * *